(12) United States Patent
Anderson et al.

(10) Patent No.: US 7,724,155 B1
(45) Date of Patent: May 25, 2010

(54) GRAPHICAL METHODS FOR ENHANCING ATTITUDE AWARENESS

(75) Inventors: Eric N. Anderson, Cedar Rapids, IA (US); John C. Frank, Marion, IA (US); Craig D. Pettit, Cedar Rapids, IA (US); Sarah Barber, Robins, IA (US); Matthew Carrico, Mt. Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 930 days.

(21) Appl. No.: 11/517,101

(22) Filed: Sep. 7, 2006

(51) Int. Cl.
*G01C 23/00* (2006.01)

(52) U.S. Cl. .................. 340/975; 340/945; 340/970; 340/973; 340/974; 340/967; 340/963; 340/964

(58) Field of Classification Search ......... 340/963–980, 340/995.17, 7.55–7.56
See application file for complete search history.

(56) References Cited

U.S. PATENT DOCUMENTS

| | | | | | |
|---|---|---|---|---|---|
| 3,574,283 | A | * | 4/1971 | Albers | 73/178 R |
| 3,605,083 | A | * | 9/1971 | Kramer | 340/972 |
| 3,792,427 | A | * | 2/1974 | Younkin | 340/975 |
| 4,172,632 | A | * | 10/1979 | Holmes, Jr. | 359/465 |
| 5,798,713 | A | * | 8/1998 | Viebahn et al. | 340/974 |
| 6,054,937 | A | * | 4/2000 | Von Viebahn et al. | 340/961 |
| 6,057,786 | A | * | 5/2000 | Briffe et al. | 340/975 |
| 6,173,220 | B1 | * | 1/2001 | Schmitt | 701/4 |
| 6,489,898 | B1 | * | 12/2002 | Nicholls | 340/975 |
| 6,496,760 | B1 | * | 12/2002 | Michaelson et al. | 701/3 |
| 6,567,014 | B1 | * | 5/2003 | Hansen et al. | 340/980 |
| 6,946,976 | B1 | * | 9/2005 | Langner et al. | 340/971 |
| 7,268,702 | B2 | * | 9/2007 | Chamas et al. | 340/975 |
| 7,418,318 | B2 | * | 8/2008 | Hrabak et al. | 701/3 |
| 2007/0085705 | A1 | * | 4/2007 | He et al. | 340/967 |

* cited by examiner

*Primary Examiner*—Daniel Wu
*Assistant Examiner*—Son M Tang
(74) *Attorney, Agent, or Firm*—Matthew J. Evans; Daniel M. Barbieri

(57) ABSTRACT

An avionics display is disclosed. A synthetic rendering of terrain is created using stored terrain data. A horizon line is overlaid upon the synthetic rendering of terrain. The horizon line represents zero degrees pitch attitude in a direction of travel of an aircraft in which the avionics display is installed. The horizon line is configured to move in response to attitude-changing movement of the aircraft. An attitude cue is overlaid upon the synthetic rendering of terrain and depicted on first and second sides of the horizon line such that the synthetic rendering of terrain remains substantially visible. The attitude cue has a first appearance on the first side of the horizon line and a second appearance on the second side of the horizon line. The first appearance is visually contrasted from the second appearance.

17 Claims, 9 Drawing Sheets

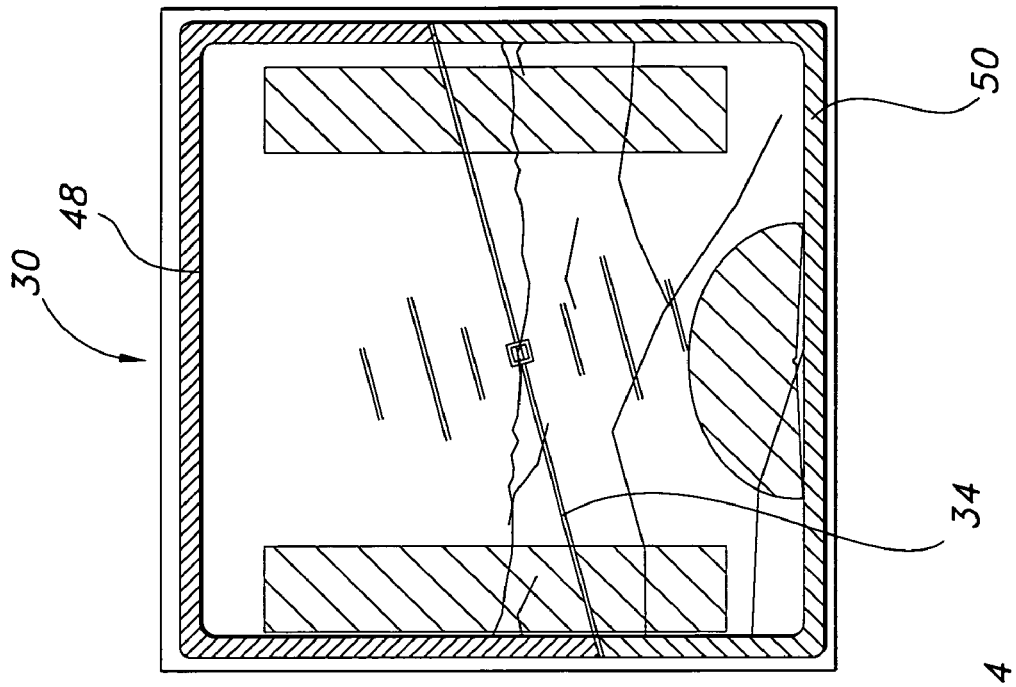
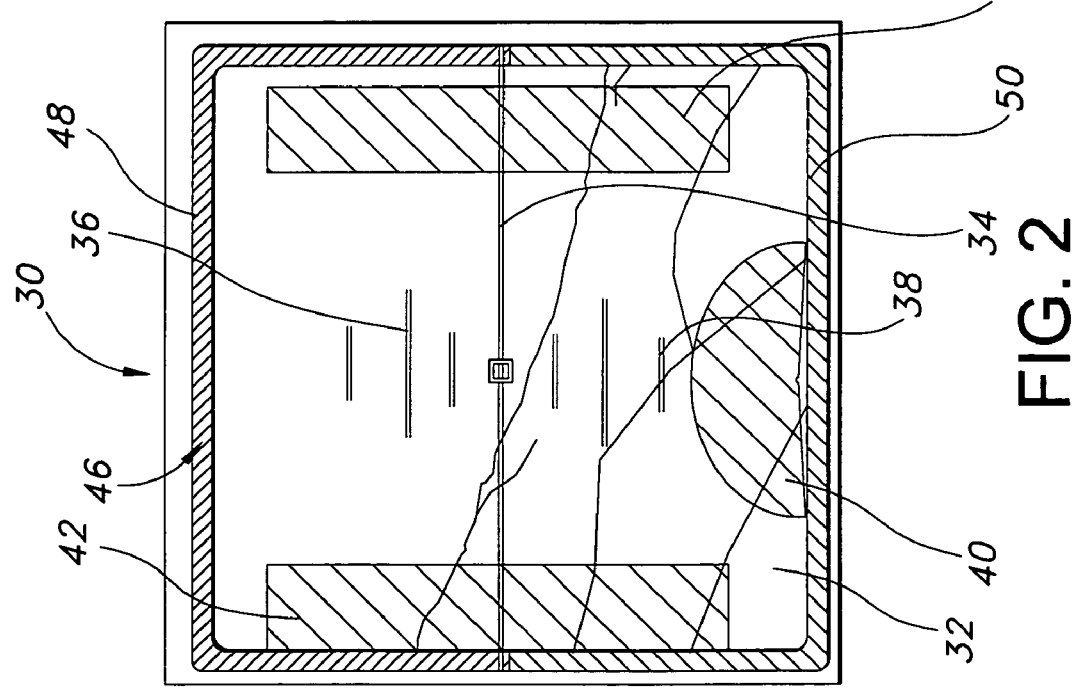

GRAPHICAL METHODS FOR ENHANCING ATTITUDE AWARENESS

FIELD OF THE INVENTION

The invention relates to avionics, and more particularly, to the display of aircraft attitude information.

BACKGROUND OF THE INVENTION

Synthetic vision information systems (SVIS systems) are becoming more common in avionics displays. A SVIS system is one in which a terrain display is generated or rendered using data stored in a database. A SVIS system is of great value to an aircraft pilot when flying conditions such as darkness, clouds, fog or inclement weather, which prevent the pilot from seeing surrounding terrain. FIG. 10 shows a synthetic terrain rendering 72 included in a display output of an avionics display 70. One challenge in using SVIS systems is that a pilot may confuse the displayed terrain horizon with the attitude of the aircraft. In FIG. 10 the synthetic terrain horizon 74 is downwardly slanting to the right. To correct this confusion the display will also display a horizon line 76 and pitch ladder lines 78 to communicate aircraft attitude, which during level flight conditions—zero degrees pitch and zero degrees roll—appear as horizontal lines in FIG. 10. Another example of possible confusion is shown in FIG. 12, where the synthetic terrain horizon 74 of the synthetic terrain rendering 72 appears horizontal and the horizon line 76 is angled (such as in a banked turn). Even when displaying the horizon line and pitch ladder lines, there is a risk that a pilot's eye may naturally follow the movement of the displayed terrain and ignore the attitude information superimposed thereon.

Although attitude information may be overlaid upon a synthetic terrain rendering as shown in FIG. 10, the principal source of attitude information has traditionally been an attitude direction indicator (ADI) or its more modern counterpart, an electronic attitude direction indicator (EADI). For purposes of this disclosure they will be generally considered together. Although an ADI or EADI can be an independent avionics instrument, the ADI function can also be part of a Primary Flight Display (PFD) format. FIG. 11 depicts the ADI function as part of an avionics PFD format 80. In the ADI display mode, with the aircraft flying straight and level, the display is roughly divided into two regions 82, 84. The two regions use two contrasting textures, cross-hatching, or colors, such as blue and brown, to indicate sky and ground, respectively. The horizon line 76 divides the two regions. Pitch ladder lines 78, parallel to horizon line 76, provide a measurement scale for changes in aircraft pitch. A change in the roll angle of the aircraft results in a change in the angle of horizon line 76 and pitch ladder lines 78 (FIG. 13), and a corresponding change in the area covered by regions 82, 84. The change in the roll angle is also indicated by a roll pointer 87. The combination of the two regions is sometimes termed the attitude 'sky/ground ball.' Although the ADI is a standard, independent instrument or part of a multi-function display on nearly all aircraft, there has been a general interest in revising and improving methods of displaying information in avionics suites. Instead of many small instruments or independent display formats, advances in technology have made it possible to use a smaller number of large displays configurable to display critical flight information in an integrated and convenient manner. With respect to the current disclosure, combining the attitude information with another display would free up critical cockpit display space.

As a general rule, several parameters must be kept in mind when adding imagery or symbology to an avionics display such as a primary flight display (PFD). For example, any added elements must not obscure or cover other information displayed on the PFD. Any added elements must not distract pilots from other displayed information. Furthermore, because the display of attitude is a critical function, an avionics system should always be able to display attitude information, and should not present a misleading attitude display. Also, because most pilots expect attitude information to be presented using the traditional ADI 'sky/ground ball', pitch tape and roll pointer format, any new presentation of attitude information should be intuitively and immediately associated with the traditional ADI presentation. Lastly, to meet weight and space requirements for avionics systems, the generation and display of the added elements should not require additional graphics hardware, such as processors or related circuitry.

It is therefore an object of the invention to provide aircraft attitude information in a format recognizable to aircraft pilots.

It is another object of the invention to enhance the display of attitude information in avionics systems displaying synthetic terrain renderings.

It is another object of the invention to reduce independent instrumentation or display requirements in an avionics system.

A feature of the invention is the addition of an attitude cue overlaid upon a synthetic rendering of terrain such that the rendering of terrain remains substantially visible.

An advantage of the invention is that a separate instrument or display to communicate aircraft attitude information is no longer necessary.

Another advantage is that the attitude cue is designed to be intuitive to pilots familiar with the traditional ADI display.

SUMMARY OF THE INVENTION

The invention provides an avionics display. A synthetic rendering of terrain is created using stored terrain data. A horizon line is overlaid upon the synthetic rendering of terrain. The horizon line represents zero degrees pitch attitude, as ascertained by an aircraft attitude sensor, in a direction of travel of an aircraft in which the avionics display is installed. The horizon line has a first side and a second side. The horizon line is configured to move in response to attitude-changing movement of the aircraft. An attitude cue is overlaid upon the synthetic rendering of terrain and depicted on the first and second sides of the horizon line such that the synthetic rendering of terrain remains substantially visible. The attitude cue has a first appearance on the first side of the horizon line and a second appearance on the second side of the horizon line. The first appearance is visually contrasted from the second appearance.

The invention also provides an avionics display. Means are provided for creating a synthetic rendering of terrain. Means are provided for overlaying a horizon line upon a display of the synthetic rendering of terrain. The horizon line represents zero degrees pitch attitude in a direction of travel of an aircraft in which the avionics display is installed. The horizon line has a first side and a second side. The horizon line is configured to move in response to pitch and roll movement of the aircraft. Means are provided for overlaying an attitude cue upon the synthetic rendering of terrain. The attitude cue is depicted on both sides of the horizon line such that the synthetic rendering of terrain remains substantially visible. The attitude cue has a first appearance on the first side of the horizon line and a second appearance on the second side of the horizon line. The first appearance is visually contrasted from the second appearance.

The invention further provides a method of enhancing attitude information displayed on an avionics display. A rendered display of terrain is created from stored terrain data. The display of terrain is displayed on the avionics display. A horizon line is displayed upon the display and overlaid upon the display of terrain. The horizon line represents zero degrees pitch attitude in a direction of travel of an aircraft as ascertained by an aircraft attitude sensor. An attitude cue is overlaid upon the display of terrain and on both sides of the horizon line such that the display of terrain remains substantially visible. The attitude cue has a first appearance on a first side of the horizon line and a second appearance on a second side of the horizon line. The first appearance is visually contrasted from the second appearance.

BRIEF DESCRIPTION OF THE DRAWINGS

FIG. 2 is a simplified depiction of an output of a primary flight display (PFD) with SVIS according to an embodiment of the invention.

FIG. 3 is a simplified depiction of another output of the PFD with SVIS shown in FIG. 2.

DETAILED DESCRIPTION OF THE DRAWINGS

Figure 1:
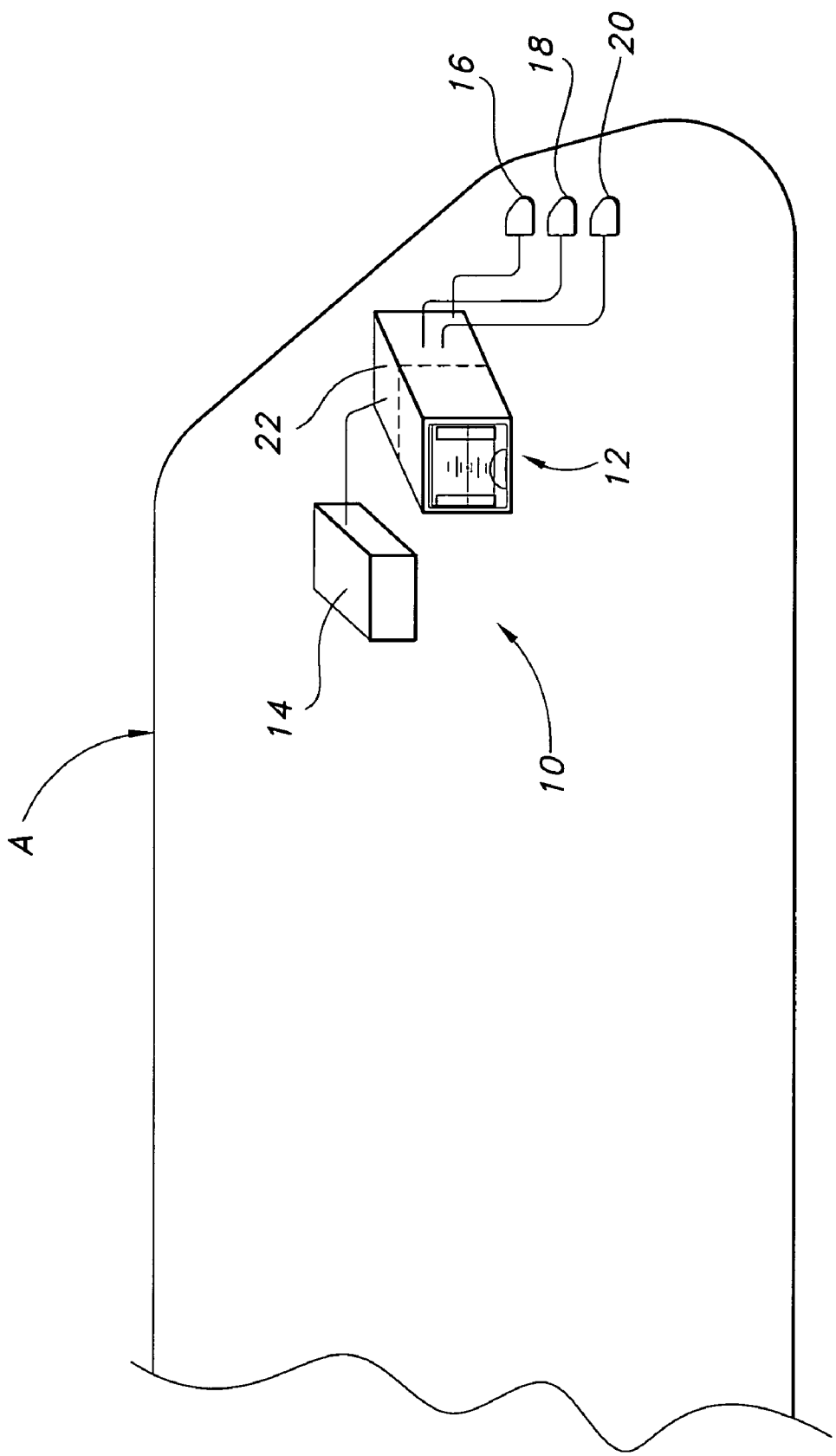
FIG. 1 is a simplified diagram of a portion of an avionics system in an aircraft according to the invention.

Describing now the invention with reference to FIG. 1, a portion of an avionics system is shown and indicated generally by reference number 10. Avionics system 10 is mounted in an aircraft A, which is partially shown in FIG. 1. Avionics system 10 includes a primary flight display (PFD) 12, a memory unit 14, and a plurality of sensors and data inputs such as a global positioning system (GPS) receiver 16 or other location sensor, attitude sensor 18, and other inputs 20. PFD 12 is designed to display a variety of flight-related parameters to a pilot of an aircraft, such as vertical speed, altitude, attitude, planned flight path, weather radar information, and the like. In the present invention PFD 12 also displays a perspective view of a rendering of terrain along the flight path of the aircraft. The rendering of terrain is produced by obtaining terrain data from memory unit 14 based upon the location of the aircraft as derived from GPS receiver 16 or other navigation system inputs. A processor 22, preferably included within PFD 12 but optionally separate therefrom, renders the artificial or synthetic view of the terrain that is then displayed upon PFD 12. The software and hardware required to create the synthetic terrain view is sometimes termed a synthetic vision information system (SVIS).

Figure 11:
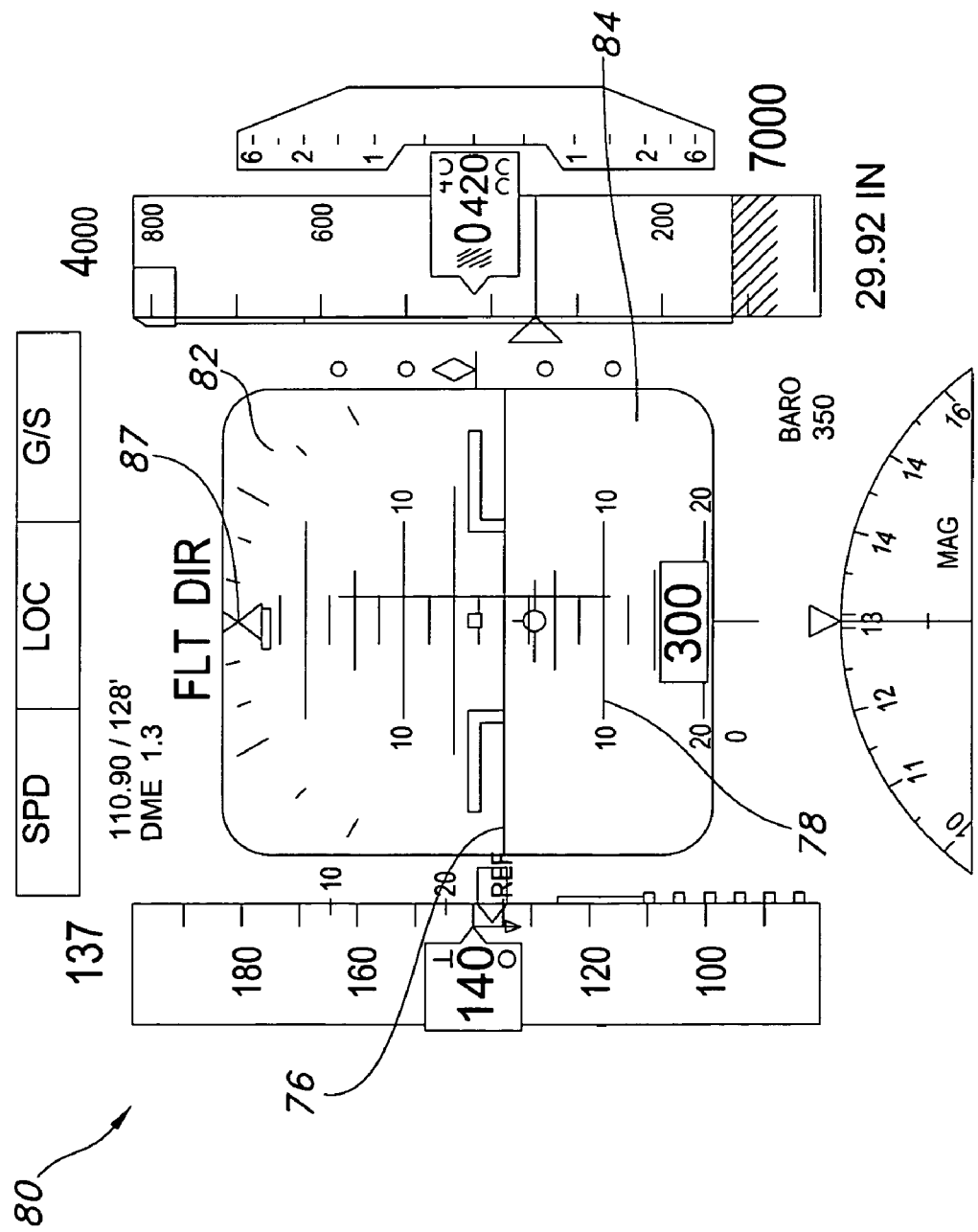
FIG. 11 is a depiction of an output of an attitude display indicator (ADI) under the same conditions as those causing the output shown in FIG. 10.
Figure 13:
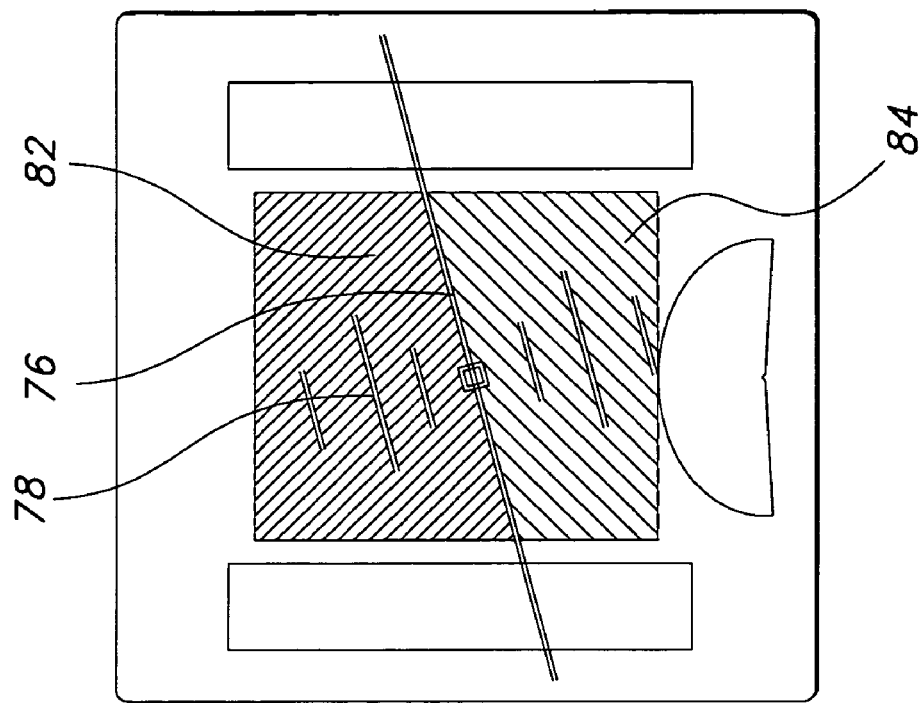
FIG. 13 is another depiction of an output of an ADI under the same conditions as those causing the output shown in FIG. 12.
Figure 12:
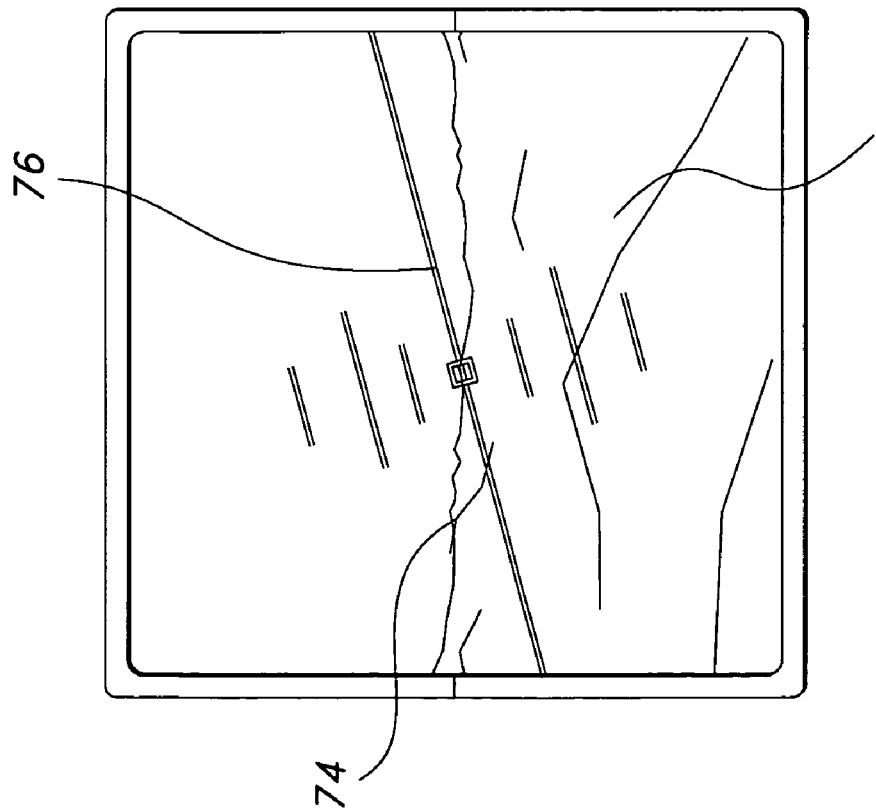
FIG. 12 is a simplified depiction of an output of a PFD according to known principles.

As previously discussed, it has been the practice for many avionics systems to include an additional PFD (such as FIGS. 11 and 13) to display attitude information. To reduce the number of primary flight displays in avionics system 10, the invention displays aircraft attitude information on PFD 12 in a manner recognizable by users of a traditional attitude display (ADI). Specifically, the invention displays elements of the traditional ADI around the synthetic vision imagery. FIG. 2 is a detailed view of a display output 30 of PFD 12 according to one embodiment of the invention. Display output 30 includes a synthetic terrain rendering 32, which as previously described is a perspective display of nearby terrain produced by synthetic vision imagery. A horizon line 34 and first and second sets of pitch ladder lines 36, 38, all of which provide aircraft pitch and other attitude information to a pilot, are overlaid upon synthetic terrain rendering 32. Other flight-relevant information, such as altitude, vertical speed, flight plans, roll pointer, flight path vector, flight path predictor, and the like, are also overlaid upon the synthetic terrain rendering in information areas such as those at 40, 42 and 44. For the purposes of simplicity in describing the invention, information areas 40, 42 and 44 are left blank.

According to the invention, attitude awareness is enhanced by placing, overlaying, or disposing attitude cues upon various portions of the synthetic terrain rendering. In the embodiment depicted in FIG. 2, the attitude cue is shown as a two-part border 46 along the perimeter of synthetic terrain rendering 32. Border 46 includes a first portion 48, which during normal, level flying conditions forms the upper half of the border. Border 46 also includes a second portion 50, which during normal, level flying conditions forms the lower half of the border. First and second portions 48, 50 have readily contrasting appearances, or in other words are presented in colors, designs, and/or textures that readily contrast with each other. In a preferred embodiment the first and second portions are presented in colors normally associated with known attitude displays. For example, first portion 48 may be blue and second portion 50 may be brown, although other colors, designs and/or textures may be used as well. To minimize confusion and to enable maximum visibility of the attitude information, the colors and/or textures of the first and second portions must also sufficiently contrast with the remainder of display output 30. First and second portions 48, 50 of the border are divided by horizon line 34. As shown in FIG. 3, when horizon line 34 is slanted in response to a change in aircraft pitch, the area of border 46 covered by first and second portions 48, 50 changes accordingly. Because the attitude cues are included on the same display output as the synthetic terrain rendering, it is less likely that the slope of the synthetic terrain rendering will be mistaken for the aircraft attitude.

Figure 4:
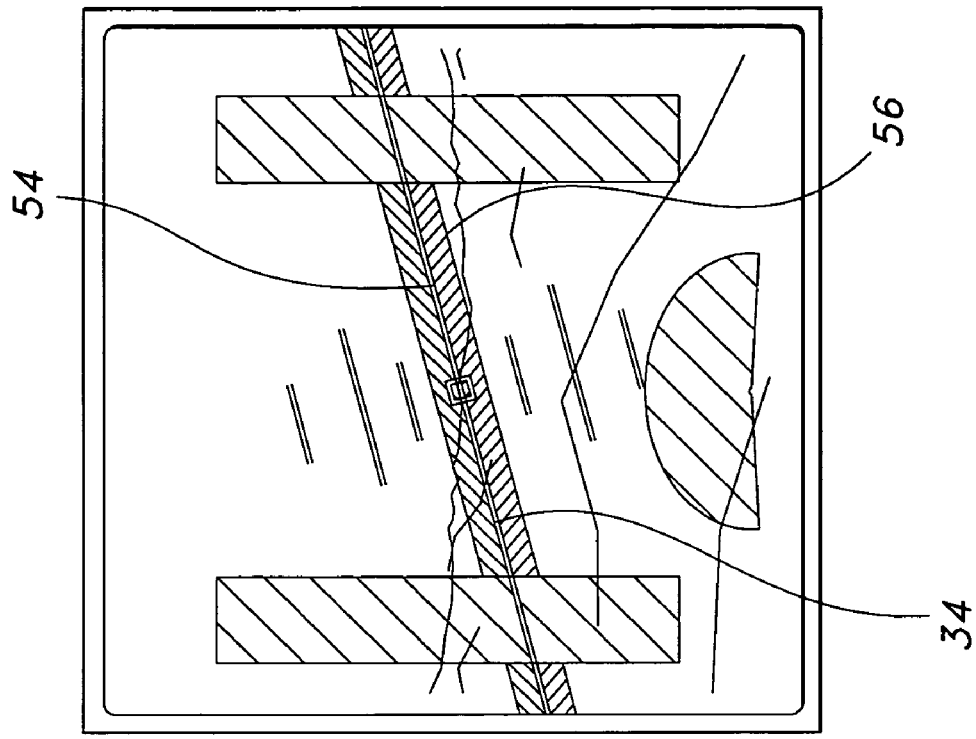
FIG. 4 is a simplified depiction of an output of a PFD with SVIS according to another embodiment of the invention.
Figure 5:
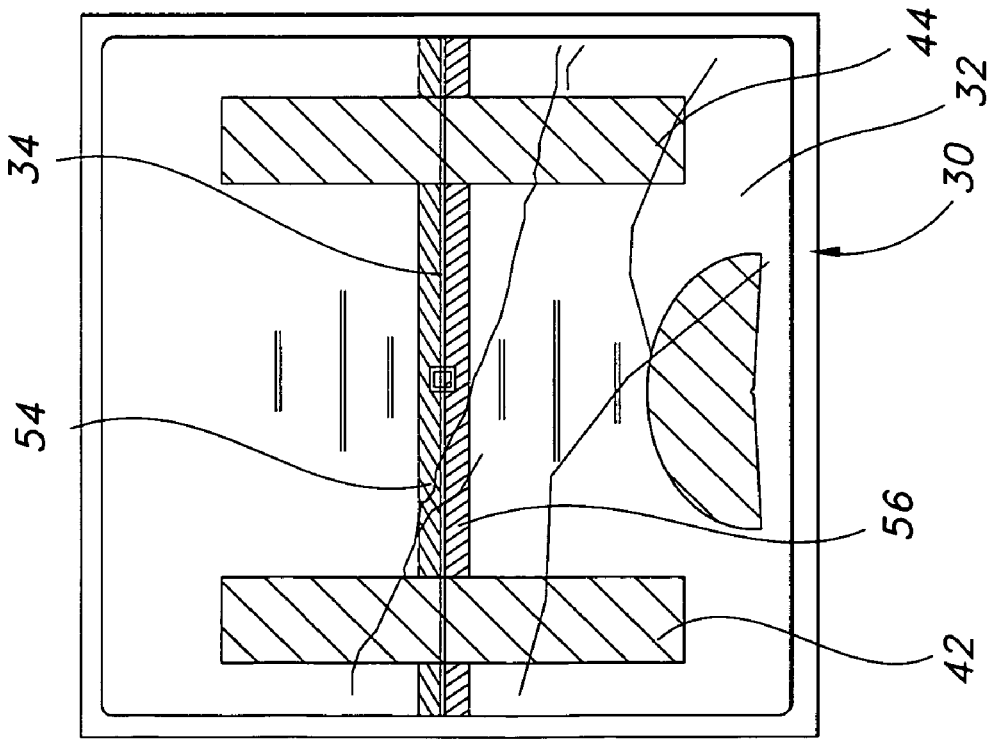
FIG. 5 is a simplified depiction of another output of the PFD with SVIS shown in FIG. 4.

FIGS. 4 and 5 depict display output 30 according to another embodiment of the invention. Instead of placing attitude cues around the border of the display output, the attitude cues in FIG. 4 are first and second substantially rectangular geometric elements or strips 54, 56 placed on either side of horizon line 34. As with the previous embodiment, the colors and/or textures of the first and second strips are preferably those colors normally associated with an ADI display, such as blue for first strip 54 and brown for second strip 56. To minimize the obscuring of synthetic terrain rendering 32, the thicknesses of the first and second strips are designed to be thin when compared to the overall dimensions of display output 30. In addition, the colors/textures of the first and second strips are semi-transparent, cross-hatched, or otherwise rendered as non-solid so that synthetic terrain rendering 32 can be seen through first and second strips 54, 56. The first and second strips may be overlaid upon information areas 42 and 44 unless the colors/textures of the first and second strips might interfere with the display of information in the information areas. As shown in FIG. 5, movement of horizon line 34 causes first and second strips 54, 56 to move as well.

Figure 6:
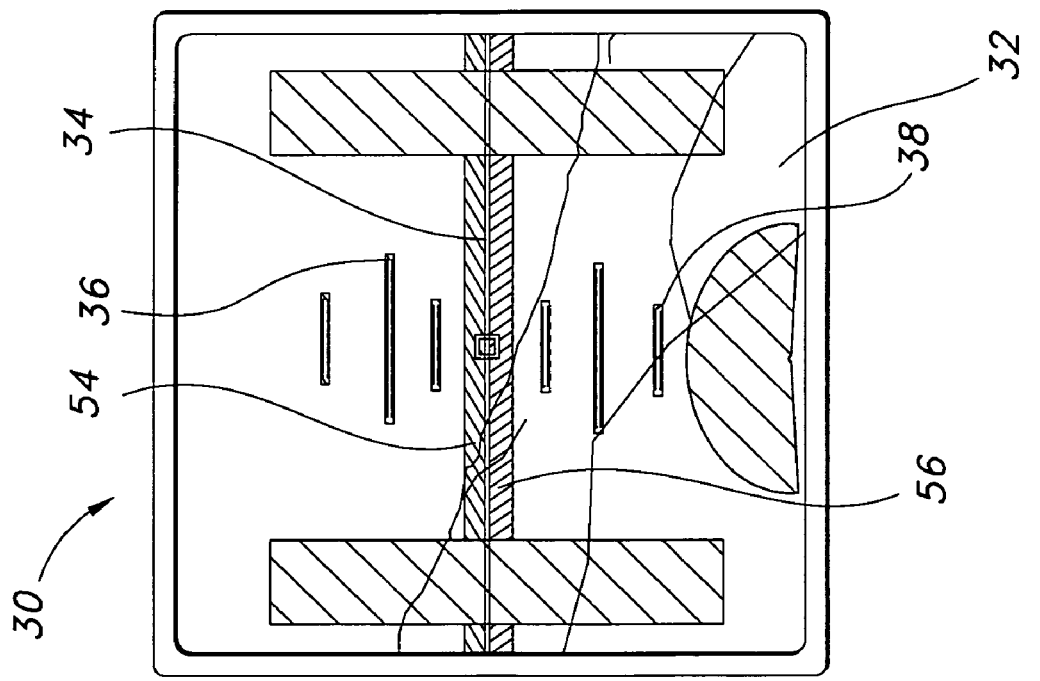
FIG. 6 is a simplified depiction of an output of a PFD with SVIS according to still another embodiment of the invention.

FIG. 6 shows display output 30 according to another embodiment of the invention. In addition to placing attitude cues along either side of horizon line 34, first and second sets of pitch ladder lines 36, 38 are provided with an outline or halo in the same colors/textures as first and second strips 54, 56, respectively. As shown in FIG. 6, to minimize the obscuring of synthetic terrain rendering 32 the outlines around the first and second sets of pitch ladder lines are preferably significantly thinner than first and second strips 54, 56. While not significant in size, however, the cumulative effect of having a plurality of the pitch ladder lines so outlined may still enhance the attitude awareness of the pilot.

Figure 7:
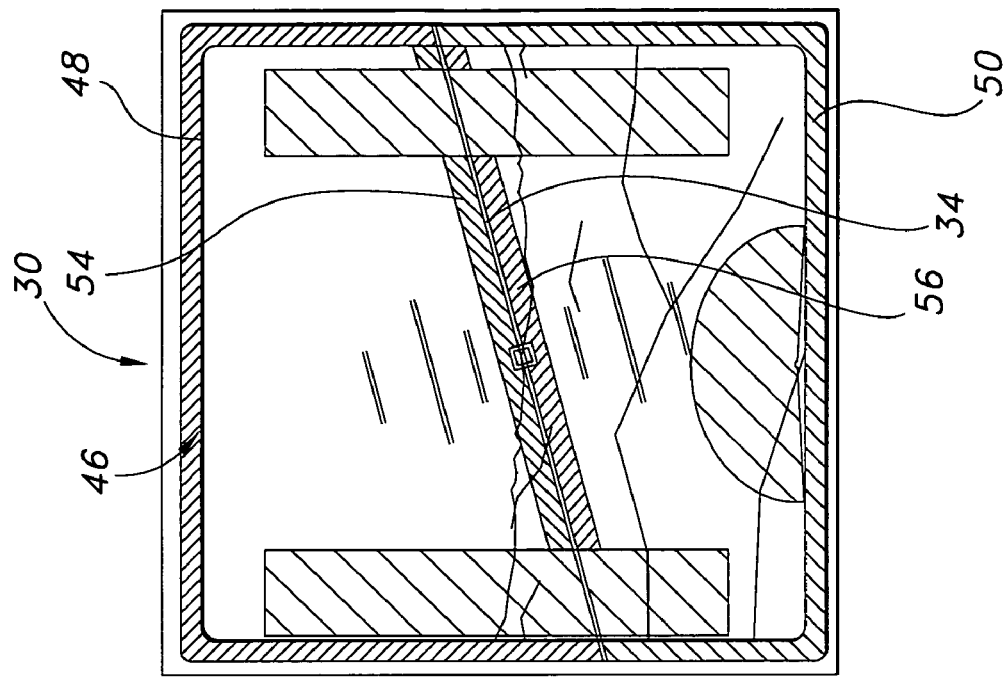
FIG. 7 is a simplified depiction of an output of a PFD with SVIS according to yet another embodiment of the invention.
Figure 8:
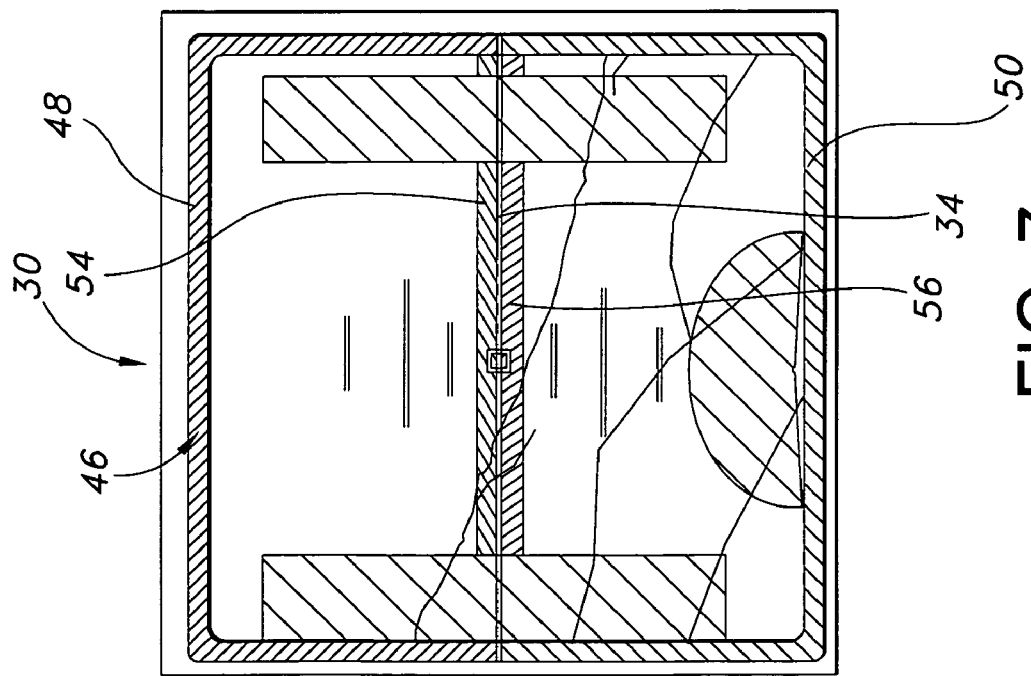
FIG. 8 is a simplified depiction of another output of the PFD with SVIS shown in FIG. 7.
Figure 9:
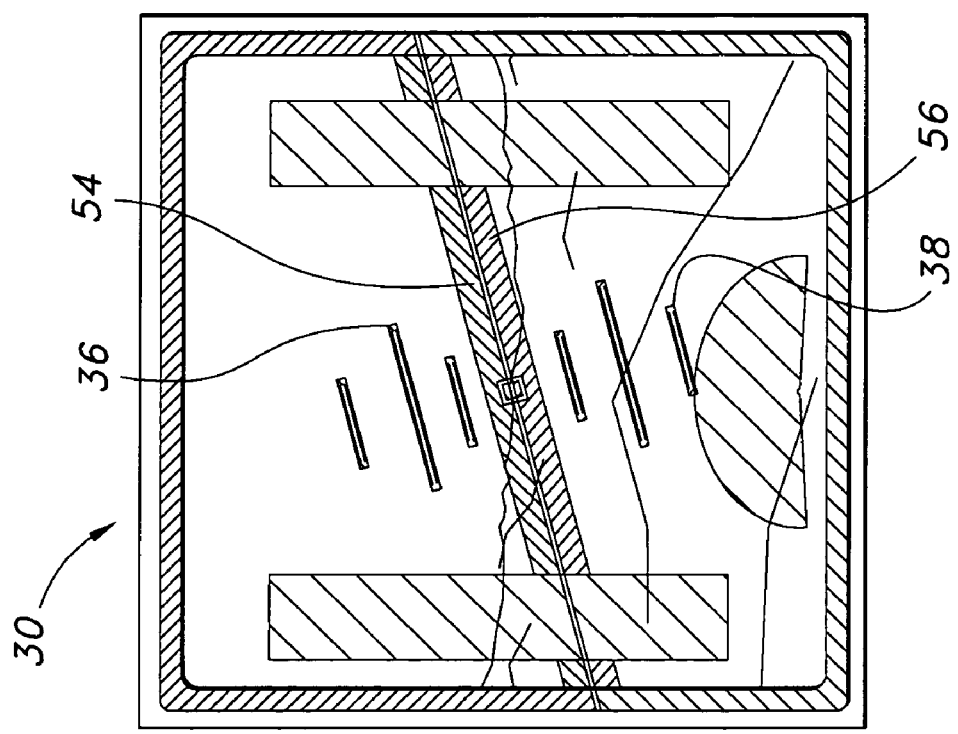
FIG. 9 is a simplified depiction of an output of a PFD with SVIS according to still another embodiment of the invention.
Figure 10:
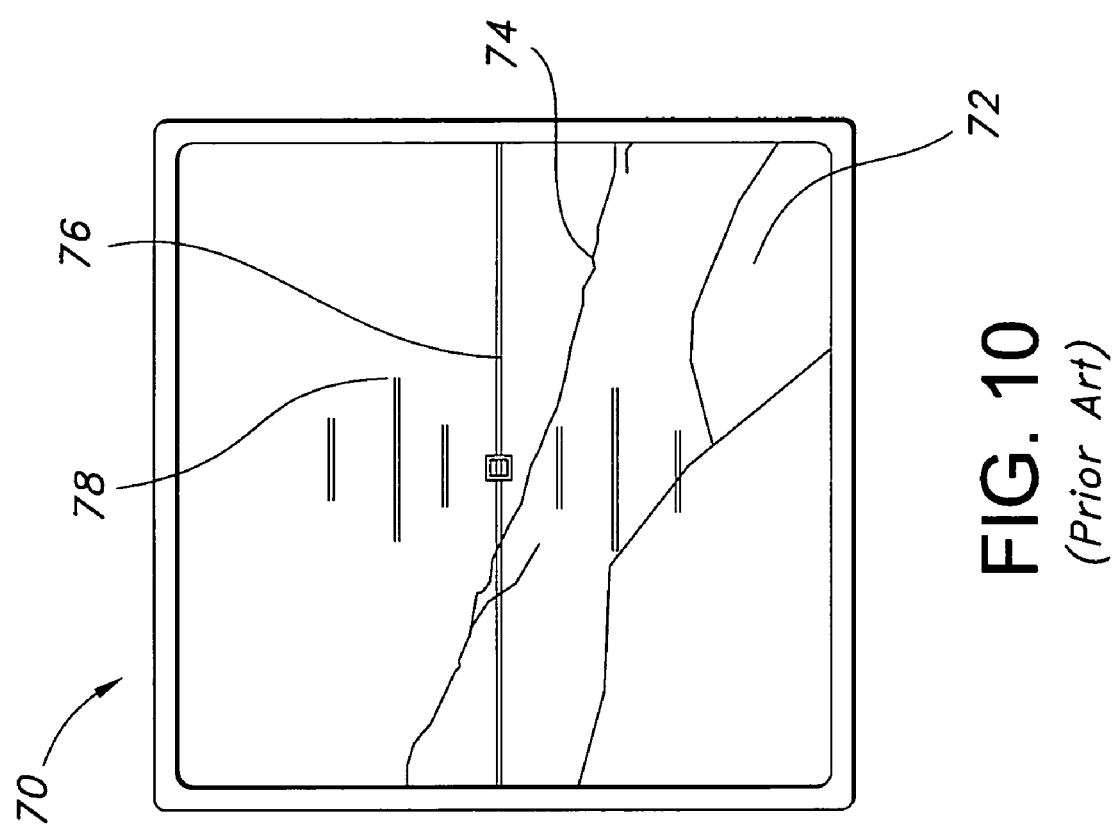
FIG. 10 is a depiction of an output of a primary flight display (PFD) according to known principles.

The attitude cues disclosed herein may be combined as desired to enhance or optimize attitude awareness. For example, FIG. 7 shows display output 30 in which first and second portions 48, 50 of border 46 are combined with first and second strips 54, 56 placed on either side of horizon line 34. As seen in FIG. 8, first and second portions 48, 50, as well as first and second strips 54, 56, are affected when horizon line 34 moves in response to a change in attitude. FIG. 9 shows display output 30 similar to what is shown in FIG. 7, and additionally includes outlines around first and second sets of pitch ladder lines 36, 38 are also outlined with outlined in the same colors/textures as first and second strips 54, 56, respectively.

The invention may be varied in many ways while keeping with the spirit of the invention. For example, the attitude cues disclosed herein may be varied in size, dimension, color, texture, or transparency level as desired or required. Also, some or all of the elements of avionics system, such as GPS receiver, memory unit 14, processor 22, and primary flight display 12, may be integrated into a single unit.

The invention has been described as providing attitude cues on a PFD displaying synthetic terrain information. However, the disclosed invention may also be overlaid or combined with other types of PFD display formats, such as forward-looking infrared, low light television, or a millimeter wave radar displays on a PFD.

An advantage of the invention is an enhanced awareness of attitude information.

Another advantage is that including the attitude cues on the same display as the synthetic terrain rendering reduces the possibility that the pilot will confuse the terrain horizon for aircraft attitude.

Still another advantage of the invention is that the display of the disclosed attitude cues does not obscure other information on the primary flight display, including the synthetic terrain rendering.

Yet another advantage is that the attitude cues are designed to be intuitively familiar to most pilots.

Still another advantage is that an instrument or display singularly dedicated to attitude display, i.e., the ADI, is eliminated from the cockpit display area. Such elimination reduces the weight and space requirements of the avionics in an aircraft.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An avionics display, comprising:
    a synthetic rendering of terrain created using stored terrain data;
    a horizon line overlaid upon the synthetic rendering of terrain, the horizon line representing zero degrees pitch attitude, as ascertained by an aircraft attitude sensor, in a direction of travel of an aircraft in which the avionics display is installed, the horizon line having a first side and a second side, and wherein the horizon line is configured to move in response to attitude-changing movement of the aircraft;
    an attitude cue overlaid upon the synthetic rendering of terrain and depicted on the first and second sides of the horizon line such that the synthetic rendering of terrain remains substantially visible, the attitude cue having a first appearance on the first side of the horizon line and a second appearance on the second side of the horizon line, and wherein the first appearance is visually contrasted from the second appearance, wherein the attitude cue is a border surrounding the rendering of synthetic terrain, the border being divided by the horizon line into first and second portions, wherein the first portion is characterized by the first appearance and the second portion is characterized by the second appearance, and wherein the attitude cue moves according to the movement of the horizon line.

2. The avionics display of claim 1, wherein the first and second appearances are contrasting colors.

3. The avionics display of claim 1, wherein the first and second appearances are contrasting textures.

4. The avionics display of claim 1, wherein the first and second appearances are contrasting designs.

5. The avionics display of claim 1, wherein the attitude cue further comprises:
    a first substantially rectangular element disposed parallel and adjacent the first side of the horizon line, the first substantially rectangular element being overlaid upon the rendering of synthetic terrain and characterized by the first appearance; and
    a second substantially rectangular element disposed parallel and adjacent the second side of the horizon line, the second substantially rectangular element being overlaid upon the rendering of synthetic terrain and characterized by the second appearance;

wherein the first and second substantially rectangular elements are configured to continue being disposed parallel to the first and second sides of the horizon line, respectively, when the horizon line moves in response to movement of the aircraft.

6. The avionics display of claim 1, wherein the attitude cue further includes:

a first plurality of pitch lines disposed parallel to and generally above the horizon line, the first plurality of pitch lines operative to indicate an increase in relative pitch of the aircraft;

a second plurality of pitch lines disposed parallel to and generally below the horizon line, the second plurality of pitch lines operative to indicate a decrease in relative pitch of the aircraft;

wherein the first plurality of pitch lines are highlighted using the first appearance and the second plurality of pitch lines are highlighted using the second appearance.

7. The avionics display of claim 6, wherein the attitude cue further comprises:

a first substantially rectangular element disposed parallel and adjacent the first side of the horizon line, the first substantially rectangular element being overlaid upon the rendering of synthetic terrain and characterized by the first appearance; and a second substantially rectangular element disposed parallel and adjacent the second side of the horizon line, the second substantially rectangular element being overlaid upon the rendering of synthetic terrain and characterized by the second appearance;

wherein the first and second substantially rectangular elements are configured to continue being disposed parallel to the first and second sides of the horizon line, respectively, when the horizon line moves in response to movement of the aircraft.

8. The avionics display of claim 1, wherein the attitude cue further comprises:

a first graphical element disposed parallel and adjacent the first side of the horizon line, the first graphical element being overlaid upon the rendering of synthetic terrain and characterized by the first appearance; and a second graphical element disposed parallel and adjacent the second side of the horizon line, the second graphical element being overlaid upon the rendering of synthetic terrain and characterized by the second appearance;

wherein the first and second graphical elements are configured to continue being disposed parallel to the first and second sides of the horizon line, respectively, when the horizon line moves in response to movement of the aircraft.

9. The avionics display of claim 8, wherein the synthetic rendering of terrain is a perspective view.

10. The avionics display of claim 8, wherein the first and second graphical elements comprise rectangular strips.

11. The avionics display of claim 8, wherein the rendering of synthetic terrain is substantially visible through the first and second graphical elements.

12. The avionics display of claim 8, wherein the attitude cue further comprises:

a first plurality of pitch lines disposed parallel to and generally above the horizon line, the first plurality of pitch lines operative to indicate an increase in relative pitch of the aircraft; and a second plurality of pitch lines disposed parallel to and generally below the horizon line, the second plurality of pitch lines operative to indicate a decrease in relative pitch of the aircraft;

wherein the first plurality of pitch lines are highlighted using the first appearance and the second plurality of pitch lines are highlighted using the second appearance.

13. An avionics display, comprising:

means for creating a synthetic rendering of terrain;

means for overlaying a horizon line upon a display of the synthetic rendering of terrain, the horizon line representing zero degrees pitch attitude in a direction of travel of an aircraft in which the avionics display is installed, the horizon line having a first side and a second side, and wherein the horizon line is configured to move in response to movement of the aircraft;

means for overlaying an attitude cue upon the synthetic rendering of terrain, the attitude cure being depicted on both sides of the horizon line such that the synthetic rendering of terrain remains substantially visible, wherein the attitude cue has a first appearance on the first side of the horizon line and a second appearance on the second side of the horizon line, and wherein the first appearance is visually contrasted from the second appearance, wherein the attitude cue is a border surrounding the rendering of synthetic terrain, the border being divided by the horizon line into first and second portions, wherein the first portion is characterized by the first appearance and the second portion is characterized by the second appearance, and wherein the attitude cue moves according to the movement of the horizon line.

14. The avionics display of claim 13, wherein the means for creating a synthetic rendering of terrain includes a synthetic vision information system.

15. The avionics display of claim 13, wherein the attitude cue further comprises:

a first substantially rectangular element disposed parallel and adjacent the first side of the horizon line, the first substantially rectangular element being overlaid upon the rendering of synthetic terrain and characterized by the first appearance; and a second substantially rectangular element disposed parallel and adjacent the second side of the horizon line, the second substantially rectangular element being overlaid upon the rendering of synthetic terrain and characterized by the second appearance;

wherein the first and second substantially rectangular elements are configured to continue being disposed parallel to the first and second sides of the horizon line, respectively, when the horizon line moves in response to movement of the aircraft.

16. The avionics display of claim 13, wherein the attitude cue further comprises:

a first plurality of pitch lines disposed parallel to and generally above the horizon line, the first plurality of pitch lines operative to indicate an increase in relative pitch of the aircraft;

a second plurality of pitch lines disposed parallel to and generally below the horizon line, the second plurality of pitch lines operative to indicate a decrease in relative pitch of the aircraft;

wherein the first plurality of pitch lines are highlighted using the first appearance and the second plurality of pitch lines are highlighted using the second appearance.

17. A method of enhancing attitude information displayed on an avionics display, comprising:

rendering a display of terrain created from stored terrain data;

displaying the display of terrain on the avionics display;

displaying upon the display a horizon line overlaid upon the display of terrain, the horizon line representing zero degrees pitch attitude in a direction of travel of an aircraft as ascertained by an aircraft attitude sensor;

overlaying an attitude cue upon the display of terrain and on both sides of the horizon line such that the display of terrain remains substantially visible, wherein the attitude cue has a first appearance on a first side of the horizon line and a second appearance on a second side of the horizon line, and wherein the first appearance is visually contrasted from the second appearance, wherein the attitude cue is a border surrounding the rendering of synthetic terrain, the border being divided by the horizon line into first and second portions, wherein the first portion is characterized by the first appearance and the second portion is characterized by the second appearance, and wherein the attitude cue moves according to the movement of the horizon line.

* * * * *